(12) United States Patent
Lötters et al.

(10) Patent No.: US 10,648,935 B2
(45) Date of Patent: May 12, 2020

(54) FLOW MEASUREMENT SYSTEM AND METHOD FOR DETERMINING AT LEAST ONE PROPERTY OF A MEDIUM

(71) Applicant: BERKIN B.V., Ruurlo (NL)

(72) Inventors: Joost Conrad Lötters, Ruurlo (NL); Egbert Jan Van Der Wouden, Ruurlo (NL); Jarno Groenesteijn, Ruurlo (NL); Wouter Sparreboom, Ruurlo (NL); Theodorus Simon Josef Lammerink, Ruurlo (NL); Remco John Wiegerink, Ruurlo (NL)

(73) Assignee: Berkin B.V., Ruurlo (NL)

( * ) Notice: Subject to any disclaimer, the term of this patent is extended or adjusted under 35 U.S.C. 154(b) by 207 days.

(21) Appl. No.: 15/112,625

(22) PCT Filed: Jan. 23, 2015

(86) PCT No.: PCT/NL2015/050040
§ 371 (c)(1),
(2) Date: Jul. 19, 2016

(87) PCT Pub. No.: WO2015/112009
PCT Pub. Date: Jul. 30, 2015

(65) Prior Publication Data
US 2016/0334349 A1    Nov. 17, 2016

(30) Foreign Application Priority Data
Jan. 23, 2014  (NL) ...................................... 2012126

(51) Int. Cl.
*G01N 25/00* (2006.01)
*G01N 25/44* (2006.01)
(Continued)

(52) U.S. Cl.
CPC .............. *G01N 25/44* (2013.01); *G01K 17/12* (2013.01); *G01N 25/005* (2013.01); *G01F 1/68* (2013.01); *G01F 1/84* (2013.01)

(58) Field of Classification Search
CPC ...... G01F 25/0007; G01F 1/68; G01F 1/6845; G05D 7/0638; G01N 25/005; G01K 17/12
See application file for complete search history.

(56) References Cited

U.S. PATENT DOCUMENTS 7,043,374 B2 * 5/2006 Wang .................... G01F 1/6842
702/45
2003/0046983 A1 * 3/2003 Sato ........................ G01N 7/00
73/53.01
(Continued)

FOREIGN PATENT DOCUMENTS

| EP | 1867962 | 3/2010 |
| EP | 2397823 | 12/2011 |
| EP | 2530438 A1 | 12/2012 |

OTHER PUBLICATIONS

Lötters, J. C., Lammerink, T. S., Groenesteijn, J., Haneveld, J., & Wiegerink, R. J. (2012). Integrated thermal and microcoriolis flow sensing system with a dynamic flow range of more than five decades. Micromachines, 3(1), 194-203.

*Primary Examiner* — Mohamed Charioui
*Assistant Examiner* — Christine Y Liao
(74) *Attorney, Agent, or Firm* — Casimir Jones, S.C.; Tanya Arenson

(57) ABSTRACT

The invention relates to a flow measurement system for determining a flow of a medium, comprising a Coriolis flow sensor, a thermal flow sensor and a processing unit connected thereto. According to the invention, the processing unit is arranged for determining, based on the output signals of both the Coriolis flow sensor and the thermal sensor, at (Continued)

Figure 1:
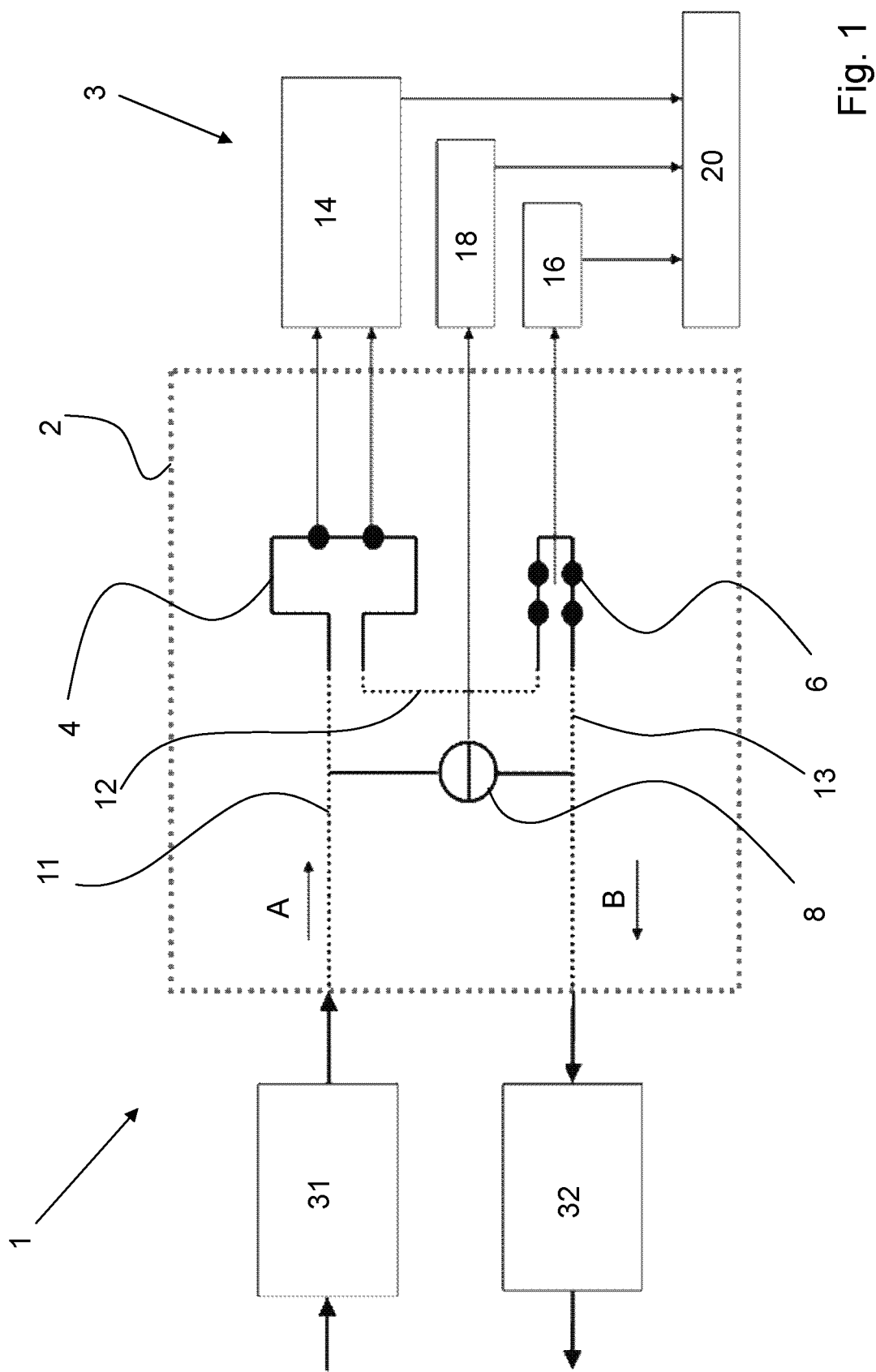

least one of the thermal conductivity and the specific heat capacity of a medium in the flow measurement system. The invention further relates to a method of determining at least one of the thermal conductivity and the specific heat capacity of a medium.

16 Claims, 5 Drawing Sheets

(51) Int. Cl.
  *G01K 17/12* (2006.01)
  *G01F 1/68* (2006.01)
  *G01F 1/84* (2006.01)

(56) References Cited

U.S. PATENT DOCUMENTS

| | | | | |
|---|---|---|---|---|
| 2004/0204885 A1* | 10/2004 | Wang | ............... | G01F 1/6842 |
| | | | | 702/100 |
| 2006/0123892 A1* | 6/2006 | Brekelmans | ......... | G01F 1/6847 |
| | | | | 73/61.76 |
| 2008/0009978 A1* | 1/2008 | Smirnov | ............. | G05D 7/0635 |
| | | | | 700/282 |
| 2010/0116048 A1* | 5/2010 | Fulkerson | ........... | A61M 1/3663 |
| | | | | 73/204.11 |
| 2011/0209526 A1* | 9/2011 | Wagner | ................ | G01F 1/6965 |
| | | | | 73/25.01 |
| 2014/0260513 A1* | 9/2014 | Smirnov | ............ | G01F 25/0007 |
| | | | | 73/1.34 |

\* cited by examiner

FLOW MEASUREMENT SYSTEM AND METHOD FOR DETERMINING AT LEAST ONE PROPERTY OF A MEDIUM

The invention relates to a flow measurement system for determining a property of a medium, wherein the system comprises a flow sensor.

The invention furthermore relates to a method for determining a property of a medium.

In many fields of technology, knowledge of both the flow rate and composition of a gas or liquid medium is important. This is true, for instance, in flow chemistry for the production of specialty drugs, production of the right mix of gases for medical purposes, and measurement of the composition of fuel gas to determine its energy content.

In medical infusion pumps, especially in neonatology, it is essential to know both the flow rate of the medium and its composition, where a new-born baby should receive both the right and the right amount of medicine and/or nutrient. A difficulty here is that the flow rates involved in this example are extremely small, and therefore difficulties arise with respect to accuracy of measurements.

It is an object of the present invention to provide a flow measurement system that allows measurement of the flow rate and at least one physical property of a medium, in particular a gas and/or liquid medium.

To this end, the invention provides a flow measurement system for determining a flow of a medium, comprising a Coriolis flow sensor, a thermal flow sensor, and a processing unit connected to the Coriolis sensor and to the thermal sensor. According to the invention, the processing unit is arranged for determining, based on the output signals of both the Coriolis flow sensor and the thermal sensor, in particular based on a combination of the output signals of both the Coriolis flow sensor and the thermal sensor, at least one of the thermal conductivity and the specific heat capacity of a medium in the flow measurement system.

With the flow measurement system, flow may be measured using either the Coriolis flow sensor or the thermal flow sensor (or both). The combination of the Coriolis flow sensor and the thermal sensor allow an assessment of at least one of the thermal conductivity and the specific heat capacity of a medium in the flow measurement system, as will be explained below.

In general, the processing unit is arranged for determining at least one of the thermal conductivity and the specific heat capacity of a medium in the flow measurement system by comparing the output signals of both the Coriolis flow sensor and the thermal sensor.

By comparing the output signals of the thermal flow sensor to the output signals of the Coriolis flow sensor, in particular at low flows, the specific heat capacity of the medium can be calculated. It was observed that when the output signal of the thermal flow sensor is plotted against the output signal of the Coriolis flow sensor, the slope of the curve is a measure for the heat capacity of the medium that is inside both sensors. The resulting curve can be described by a function having medium independent sensor constants:

$$S=f(y,C) \quad (1)$$

With S the output signal of the thermal flow sensor, and y the output signal of the Coriolis flow sensor. C is a medium independent sensor constant that may be determined by using a reference medium, with which calibration of the flow measurement system may take place.

When a medium other then the reference medium is present in the system, equation (1) may be solved for a certain value of S. The ratio of the solved value for y and the measured value for y, multiplied by the value of the specific heat capacity of the reference medium air, provides the value of the specific heat capacity of the actual medium.

Thus, from the above it is clear that at least the specific heat capacity may be determined by using the output signals of both the Coriolis flow sensor and the thermal flow sensor.

Additionally or alternatively, the thermal conductivity may be determined as well. The thermal conductivity can be determined by comparing the output signals of the thermal and Coriolis flow sensors at higher flows. When the output signal of the thermal flow sensor is plotted against the output signal of the Coriolis flow sensor, the slope of the curve at higher flows is a measure for the thermal conductivity of the medium that is inside both sensors. The resulting curve can be described by:

$$S=f(y,\lambda,X) \quad (2)$$

Where S is the output signal of the thermal flow sensor, y is the output signal of the Coriolis flow sensor, $\lambda$ the thermal conductivity, and X is a medium independent sensor constant. The thermal conductivity may be determined by solving equation (2) for $\lambda$, with known (measured) values for the output signals of the thermal flow sensors and of the Coriolis flow sensor, and using the sensor constant X.

With the above, a flow measurement system is obtained with which the flow, and at least one of the specific heat capacity and the thermal conductivity of a medium may be determined. With this, the object of the invention is achieved.

In particular, from the above it follows that the processing unit may be arranged for determining at least one of the thermal conductivity and the specific heat capacity based on an equation $S=f(y, \ldots)$ having at least two variables, wherein the at least two variables are defined by the output of the Coriolis flow sensor (y) and the output of the thermal sensor (S). The processing unit may be arranged for solving the equation based on the output signals. The processing unit may additionally, or alternatively, be arranged for using the output signals for solving said equation by means of a reference table (look-up table) stored in the processing unit or in a unit connected thereto.

In a particular embodiment, equation (1) may be specified by a polynomial function, in an embodiment a third order polynomial function, to describe the relationship between the output signal of the Coriolis flow sensor, and the output signal of the thermal flow sensor:

$$S=C_1 y^3+C_2 y^2+C_3 y+C_4 \quad (3)$$

Wherein C1-C4 are medium independent sensor constants that may be obtained during calibration. As indicated above, equation (3) may be solved for a certain value of S. The ratio of the solved value for y and the measured value for y, multiplied with the value of the specific heat capacity of the reference medium air, provides the value of the specific heat capacity of the actual medium. The function may be stored in the processing unit, such that the processing unit may solve equation 3 based on measurements obtained by the system.

In an embodiment, the flow measurement system comprises a reference value of a thermal conductivity of a test fluid. The reference value may be stored in the processing unit. The processing unit may then be arranged for using the reference value of the thermal conductivity for determining the thermal conductivity of the medium in the flow measurement system, as described above.

In an embodiment, the thermal conductivity may be obtained from the slope of the curve obtained by plotting the output signal of the thermal flow sensor against the output signal of the Coriolis flow sensor. It was found that the curve specified by equation (2) may be more specifically described by:

$$S = X_o c_p \Phi_m \left(1 - \frac{X_1}{\lambda} c_p \Phi_m - X_2 c_p \Phi_m\right) \quad (4)$$

Where S is the output signal of the thermal flow sensor, $X_0$-$X_2$ are medium independent sensor constants, $c_p$ is the specific heat capacity, $\Phi_m$ the mass flow and $\lambda$ the thermal conductivity.

In an embodiment the thermal conductivity $\lambda$ is determined from equation (4) by curve fitting, i.e. without any direct analytical relation.

In a preferred embodiment, the flow measurement system further comprises a pressure sensor. By comparing the output signals of the Coriolis flow sensor and the pressure sensor, and taking the density into account which is obtainable by the Coriolis flow sensor, the viscosity of the medium can be calculated.

In an embodiment, the pressure sensor is a differential pressure sensor, arranged for measuring the differential pressure between the inlet and the outlet.

In an embodiment of the flow measurement system, the processing unit is connected to the pressure sensor, and is arranged for determining, based on the output signals of both the Coriolis flow sensor and the pressure sensor, the viscosity of the medium in the flow measurement system.

In an embodiment, the following equation may be used for determining the viscosity of the medium:

$$\eta = \frac{\Delta P}{\Phi_v * R_0} = \frac{\Delta P * \rho}{\Phi_m * R_0} \quad (5)$$

The medium independent hydraulic resistance $R_0$ is determined by using a calibration medium, such as air, as a reference medium. The mass flow $\Phi m$ and the density $\rho$ may in an embodiment be measured by the Coriolis sensor, the pressure drop $\Delta P$ is obtainable from the pressure sensor.

For gases, the measured density may be corrected for the compressibility of the gas.

The processing unit may be arranged for determining a characteristic value of the flow of the medium in the flow measurement system, in particular the Reynolds number. The Reynolds number is based on the pressure and the viscosity, which is obtainable from equation (5) as described above, using the pressure sensor and the Coriolis flow sensor. This characteristic value may come in use, as will be described later.

The flow measurement system comprises in an embodiment a reference characteristic value of the flow stored in the processing unit, wherein the processing unit is arranged for determining the specific heat capacity when the characteristic value of the flow determined exceeds or is below the reference characteristic value of the flow, and for determining the thermal conductivity when the characteristic value of the flow determined is below or exceeds, respectively, the reference characteristic value of the flow.

For instance, it has turned out that at low flows the thermal conductivity may be determined, and that at relatively high flows the specific heat capacity may be determined. The characteristic value of the flow of the medium in the flow measurement system, in particular the Reynolds number, may be used to determine whether the medium in the flow measurement system has a low or high flow. The determined characteristic value may be compared to a reference value stored in the processing unit, and based on that, one of the specific heat capacity and the thermal conductivity may be determined. It is possible that the Reynolds number is used as the characteristic value of the flow. In that case, relatively low Reynolds numbers belong to relatively low flows, and relatively high Reynolds numbers belong to relatively high flows. It is possible that the inverse of the Reynolds number is used, which in fact would yield a higher number for lower flows. in that case the above still applies, mutatis mutandis.

According to an embodiment of the invention, an integrated multi-parameter flow measurement system is provided, comprising an integrated Coriolis flow sensor, an integrated thermal flow sensor, and preferably a pressure sensor. The processing unit is in an embodiment integrated as well. The integrated system enables on-chip measurement, analysis and determination of flow and several physical properties of both gases and liquids. With the system, it is possible to measure the flow rate, density, viscosity, specific heat capacity and thermal conductivity of for example hydrogen, helium, nitrogen, air, argon, water and IPA.

In an embodiment, the processing unit is arranged for identifying the medium in the flow measurement system, in particular based on determined values for at least one of specific heat capacity, thermal conductivity and density. Identifying may occur by comparing the determined values of the specific heat capacity and/or thermal conductivity and/or density to values stored in the system, for instance stored in the processing unit.

In an embodiment, the medium is a mixture comprising two known components, wherein the processing unit is arranged for determining the fraction of each of the known components, in particular based on determined values for at least one of specific heat capacity, thermal conductivity and density of the mixture. A reference table comprising values of specific heat capacity, thermal conductivity, and/or density of various mediums, which may be stored in the processing unit, may be used in this.

According to an aspect, the invention provides a method of determining at least one of the thermal conductivity and the specific heat capacity of a medium, said method comprising the steps of:
  providing a medium of which at least one of the thermal conductivity and the specific heat capacity is to be determined;
  conducting the medium through a Coriolis flow sensor for obtaining an output signal of the Coriolis flow sensor;
  conducting the medium through a thermal flow sensor for obtaining an output signal of the thermal flow sensor;
  determining, based on the output signals of both the Coriolis flow sensor and the thermal sensor, at least one of the thermal conductivity and the specific heat capacity of the medium in the flow measurement system.

According to an embodiment, the method further comprises the steps of determining a pressure, in particular a differential pressure of the medium.

The method may comprise the step of determining, based on the output signals of the Coriolis flow sensor and pressure determined, the viscosity of the medium in the flow measurement system.

The method comprises in an embodiment the further step of determining a characteristic value of the flow of the medium in the flow measurement system, in particular the Reynolds number.

In an embodiment, the method further comprises the step of comparing the characteristic value of the flow determined to a reference characteristic value of the flow, and based on this comparison determining:
- the specific heat capacity when the characteristic value determined is below the reference characteristic value; and
- the thermal conductivity when the characteristic value determined exceeds the reference characteristic value.

A reference specific heat capacity value of a test fluid may be used for determining the specific heat capacity of the medium in the flow measurement system.

The method may in an embodiment comprise the step of comparing an expected value of the output signal of one of the Coriolis flow sensor and the thermal flow sensor to a measured value of said one of the Coriolis flow sensor and the thermal flow sensor, wherein the ratio of the expected value to the measured value is used for determining the specific heat capacity of the medium.

Figure 2:
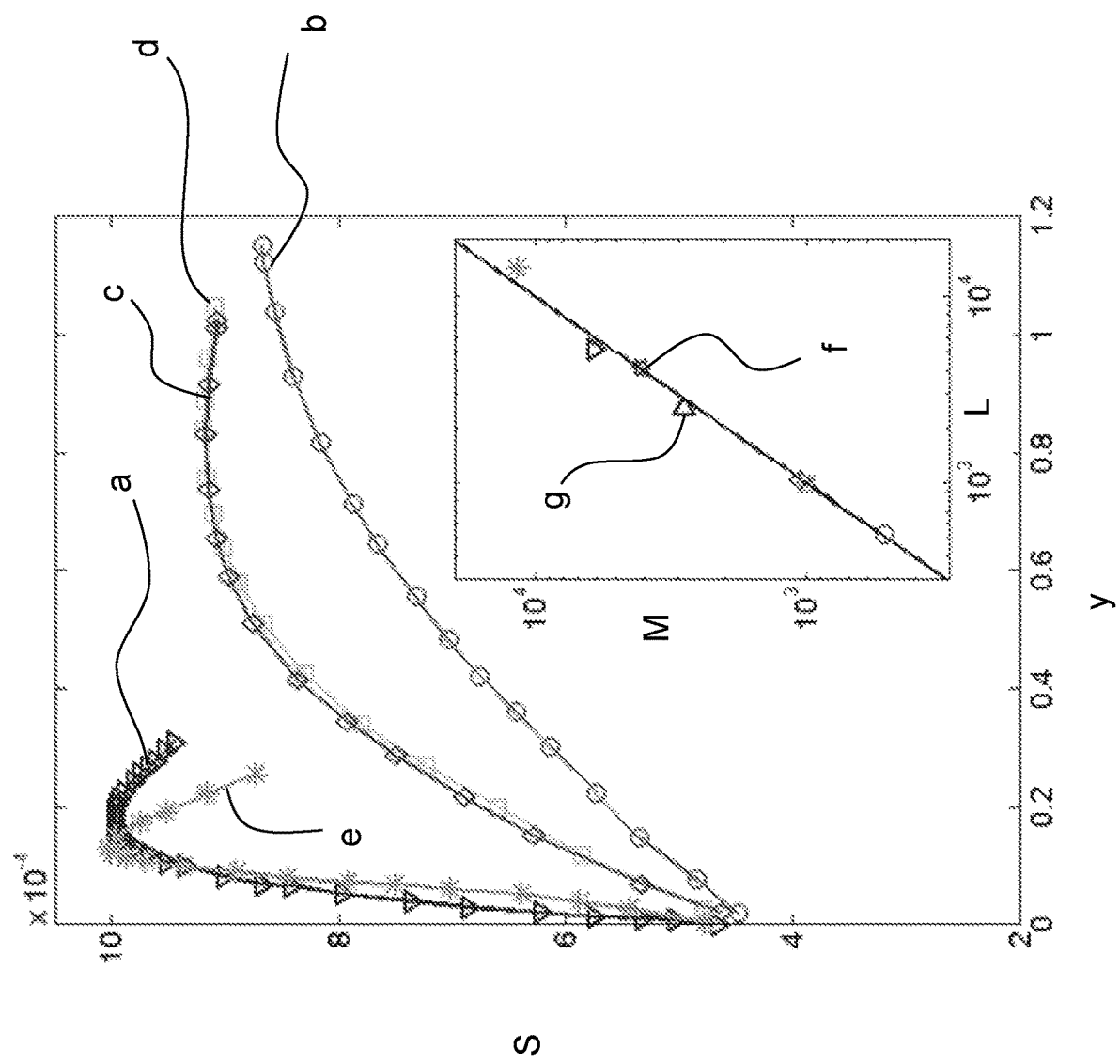
Figure 3:
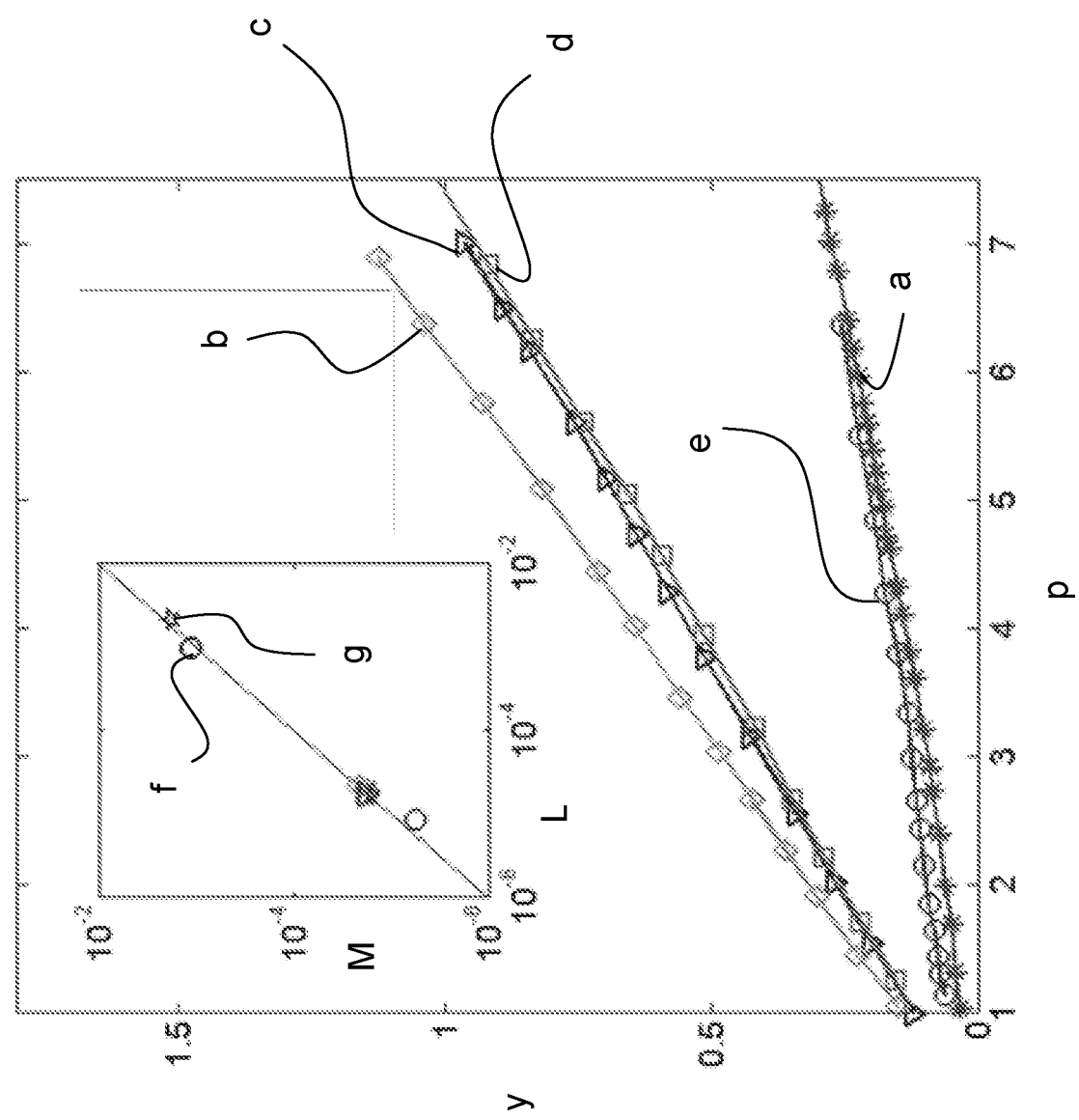
Figure 4:
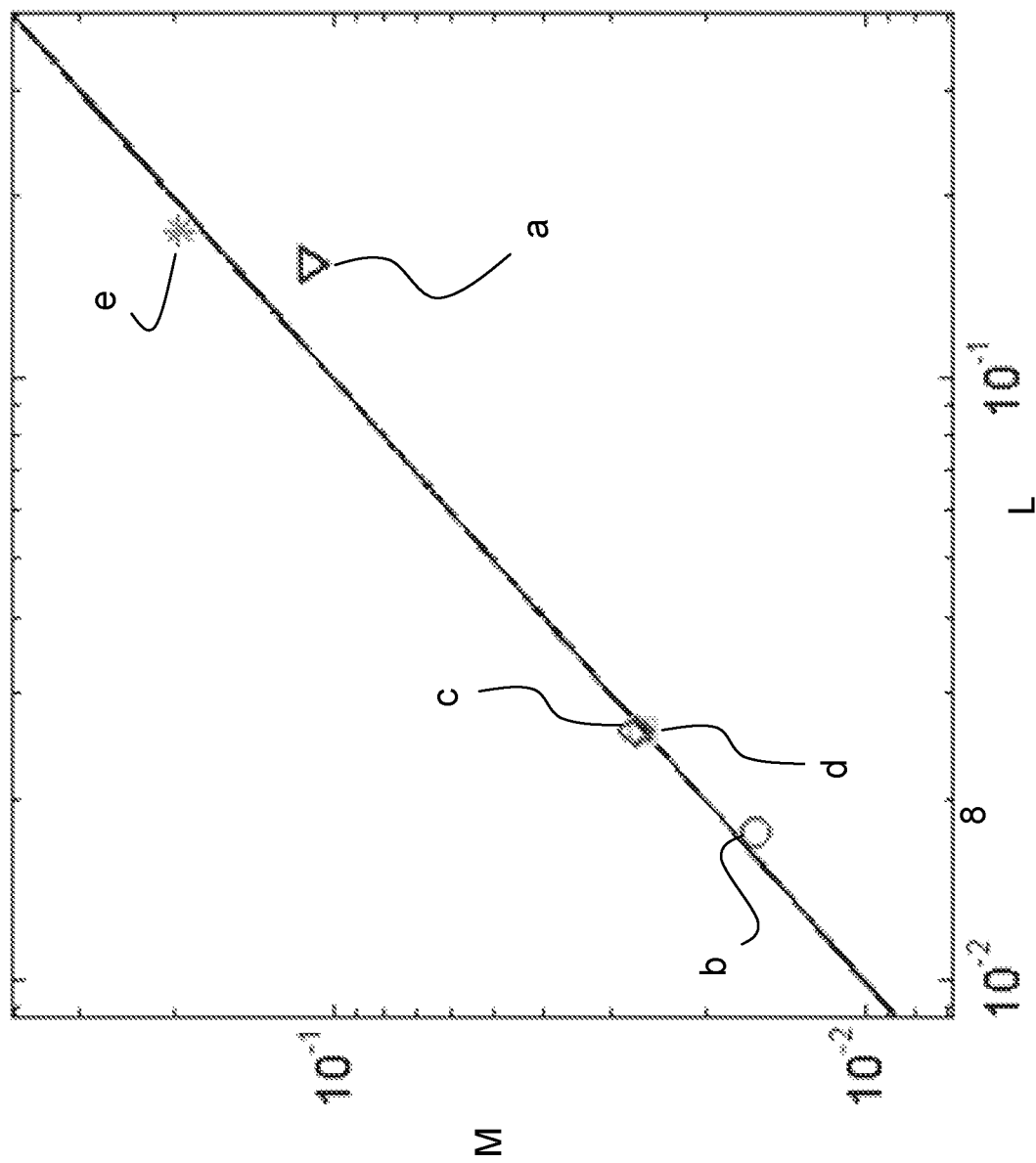
Figure 5:
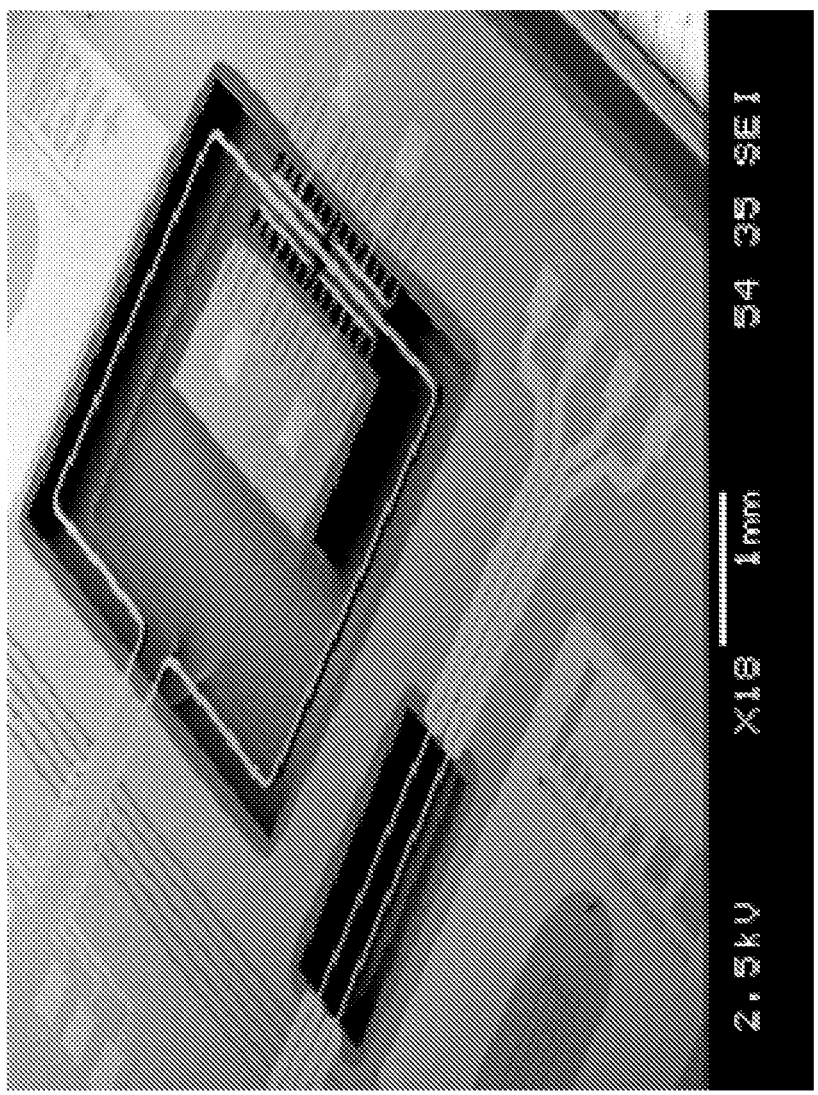

The invention and advantages thereof will be explained next with respect to several exemplary, non-limiting embodiments thereof, in combination with the accompanying figures, in which:

FIG. 1—schematic overview of a set-up comprising a flow measurement system according to the invention;

FIG. 2—Diagram showing the output signal of the thermal flow sensor S versus the output signal of the Coriolis flow sensor y for determining the specific heat capacity of the medium, and comparison (inset) of measured values M versus values from literature L;

FIG. 3—Diagram showing the output signal of the Coriolis flow sensor y versus the output signal of the pressure sensor p for determining the viscosity of the medium, and comparison (inset) of measured values M versus values from literature L;

FIG. 4—Comparison of measured values M versus values from literature L for thermal conductivity;

FIG. 5—picture of an integrated multi-parameter flow measurement system according to an embodiment of the invention.

FIG. 1 shows a schematic overview of a set-up including a flow measurement system 1 according to an embodiment of the invention. The flow measurement system 1 comprises a flow tube 11, 12, 13 through which a medium may flow. The flow direction through the tube is indicated by arrows A and B. The system 1 comprises a Coriolis flow sensor 4, and a thermal flow sensor 6.

Such a Coriolis flow sensor 4 and thermal flow sensor 6 are known per se to those skilled in the art, and thus these will not be further described here. Reference is given for instance to EP 2 397 823 A1 and EP 2 530 438 which describe details of a Coriolis flow sensor, and EP 1 867 962 A1 which describes details of a thermal flow sensor. The invention is not limited to any specific type of Coriolis or thermal flow sensor.

The flow measurement system 1 shown in FIG. 1 comprises a pressure sensor 8, which in this case is a differential pressure sensor 8. This sensor is connected to the flow tube 11 upstream of the sensors 4, 6; as well as to the flow tube 13 downstream of the sensors 4, 6.

The sensors 4, 6, 8 are connected to a processing unit 3. In the embodiment shown, the sensors are coupled to a computer 20 of the processing unit 3 by means of convertor elements 14, 16, 18, which may be used to initially process output signals that are generated by the sensors 4, 6, 8, or for any other suitable purpose, such as for example controlling and/or operating the sensors 4, 6, 8.

For an experimental set-up, such as shown in FIG. 1, the set-up comprises a reference pressure controller 31, upstream of the sensors, 4, 6, 8; as well as a reference flow meter positioned downstream of the sensors 4, 6, 8. These are provided for calibration and/or verification purposes.

The dashed arrow 2 in FIG. 1 denotes a sensor unit 2 of a flow measurement system according to an embodiment of the invention. The sensor unit comprises an integrated Coriolis flow sensor 4, and an integrated thermal flow sensor 6. Preferably, the sensor unit 2 additionally comprises the pressure sensor 8. The flow measurement system according to the invention further comprises the processing unit 3. Thus, a basic structure of an integrated multi-parameter flow measurement system 1 is shown in FIG. 1. The system 1 here consists of an integrated Coriolis 4 and thermal flow sensor 6, and an additional differential pressure sensor 8. An example of an integrated flow measurement system on a system chip is shown in FIG. 5, which clearly shows the loop-shaped Coriolis sensor (top right) and the thermal flow sensor (lower left). Such a system chip may be used for accurate measurements of both gases and liquids, since this system maximally reduces the internal volume of the system. This is advantageous compared to a system composed of separate devices.

Still referring to FIG. 1, in use, fluid flow enters the system at the inlet, passes through the Coriolis and the thermal flow sensor, and leaves the system at the outlet. The differential pressure between the inlet and outlet is measured by the pressure sensor.

In an experimental setting for gas flows, a pressurised vessel was used to generate air, hydrogen, helium, argon and nitrogen flows in the range of 1 up to 20 min/min. For liquid flows, a syringe pump system was used to generate water and IPA flows in the range of 1 up to 35 mg/h through the system. Pressures in the range of 1 through 7 bar were provided to the system.

During the measurements the output signals of the pressure, thermal flow and Coriolis flow sensor were recorded simultaneously, using the processing unit 3, together with the output signals of the reference instruments 31, 32. The output signal of the thermal flow sensor 8 is a measure for the flow rate, the pressure is measured by the pressure sensor 8. The output signal of the Coriolis mass flow sensor 4 provides both the mass flow and information about the density of the medium.

Other parameters can be obtained from the output signals via a calculation model, as described earlier. By comparing the output signals of the thermal and the Coriolis flow sensors at low flows, the heat capacity of the medium can be calculated (FIG. 2). By comparing the output signals of the Coriolis flow sensor and the pressure sensor, and taking the density into account, the viscosity of the medium can be calculated (FIG. 3). The thermal conductivity can be determined by comparing the output signals of the thermal and Coriolis flow sensors at higher flows (FIG. 4).

In FIG. 2, the relation between the output of the thermal flow sensor S (y-axis) and the Coriolis flow sensor y (x-axis) is shown, which is a measure for the heat capacity of the medium. Here, the following mediums were used: a) helium, b) argon, c) nitrogen, d) air, e) hydrogen, f) water, g) IPA. All by means of equation (3) derived heat capacities were within 5% of their value as found in literature.

In FIG. 3, the relation between the output of the Coriolis flow sensor and the pressure sensor is shown, which is a measure for the viscosity of the medium. All via equation (5) derived viscosities were within 10% of their value as found in literature. The biggest deviations occur for hydrogen and helium, as it is difficult to fill the system with these gases, and a mixture between hydrogen or helium and air is likely to occur.

In FIG. 4, the values for the thermal conductivity of the measured gases are given. All via curve fitting of equation (4) found values are within 10% of their value as found in literature, except for helium a, which is within 20% of the literature value.

With the system, it is possible to determine values for specific heat capacity and thermal conductivity. It is additionally possible to identify a medium, based on determined values and reference values. It is additionally possible to identify the composition of a mixture having known components, by interpolating reference values for the known components stored in the system to match determined values.

Summarizing, the invention relates to a flow measurement system for determining a flow of a medium, comprising a Coriolis flow sensor, a thermal flow sensor and a processing unit connected thereto. According to the invention, the processing unit is arranged for determining, based on the output signals of both the Coriolis flow sensor and the thermal sensor, at least one of the thermal conductivity and the specific heat capacity of a medium in the flow measurement system.

The invention claimed is:

1. A multi-parameter flow measurement system for determining one or more physical properties of a medium, comprising:
   A. an inlet;
   B. an outlet;
   C. one or more flow tubes that connect the inlet to the outlet, the flow tubes configured to receive a medium to flow through the flow tubes;
   D. a Coriolis flow sensor in fluid communication with the flow tubes, configured to measure physical properties of the medium flowing in the flow tubes;
   E. a thermal flow sensor in fluid communication with the flow tubes, configured to measure physical properties of the medium flowing in the flow tubes; and
   F. a processing unit connected to the Coriolis flow sensor and to the thermal flow sensor, wherein the processing unit is configured to
   i. receive output signals from the Coriolis flow sensor and the thermal flow sensor, the output signals being representative of the physical properties of the medium measured by the Coriolis flow sensor and the thermal flow sensor; and
   ii. determine the thermal conductivity of the medium by plotting the output signals received from the Coriolis flow sensor and the output signals received from the thermal flow sensor against each other to generate a curve and calculating the slope of the curve, and/or
   iii. determine the specific heat capacity of the medium by plotting the output signals received from the Coriolis flow sensor and the output signals received from the thermal flow sensor against each other to generate a curve, and calculating the slope of the curve; and
   iv. provide a readout of the determined thermal conductivity and/or specific heat capacity.

2. The system of claim 1, further comprising a pressure sensor, wherein said pressure sensor measures a differential pressure.

3. The system of claim 2, wherein the processing unit is connected to the pressure sensor and determines, based on the output signals of both the Coriolis flow sensor and the pressure sensor, the viscosity of the medium.

4. The system of claim 1, wherein the processing unit further determines a characteristic value of the flow of the medium.

5. The system of claim 4, further comprising a reference characteristic value of the flow stored in the processing unit, wherein the processing unit determines the specific heat capacity when the characteristic value of the flow determined is below the reference characteristic value of the flow, and determines the thermal conductivity when the characteristic value of the flow determined exceeds the reference characteristic value of the flow.

6. The system of claim 1, further comprising a reference value of a test fluid specific heat capacity, wherein the processing unit uses the reference value for determining the thermal conductivity of the medium.

7. The system of claim 1, wherein the processing unit identifies the medium in the system based on determined values for at least one physical property selected from the group consisting of specific heat capacity, thermal conductivity, and density.

8. The system of claim 1, wherein the medium is a mixture comprising two known components, wherein the processing unit determines the fraction of each of the known components based on determined values for at least one physical property selected from the group consisting of specific heat capacity, thermal conductivity, and density of the mixture.

9. A method of determining the thermal conductivity and/or the specific heat capacity of a medium comprising the steps of:
   providing a medium of which at least one of the thermal conductivity and the specific heat capacity is to be determined;
   conducting the medium through a Coriolis flow sensor for measuring a physical property of the fluid and for obtaining an output signal of the Coriolis flow sensor representative of said physical property;
   conducting the medium through a thermal flow sensor for measuring a physical property of the fluid and for obtaining an output signal of the thermal flow sensor representative of said physical property; and
   determining, based on comparing the output signals of the Coriolis flow sensor and the output signals of the thermal sensor,
   a) the thermal conductivity of the medium in the flow measurement system, wherein the determining comprises plotting the output signals received from the Coriolis flow sensor and the output signals received from the thermal flow sensor against each other to generate a curve; and calculating the slope of the curve, and/or
   b) the specific heat capacity of the medium in the flow measurement system, wherein the determining comprises plotting the output signals received from the Coriolis flow sensor and the output signals received from the thermal flow sensor against each other to generate a curve, and calculating the slope of the curve.

10. The method of claim 9, further comprising the step of determining a pressure of the medium.

11. The method of claim 10, further comprising the step of determining the viscosity of the medium, wherein the viscosity is determined based on the output signals of the Coriolis flow sensor and pressure of the medium.

12. The method of claim 9, further comprising the step of determining a characteristic value of the flow of the medium.

13. The method of claim 12, further comprising the step of comparing the characteristic value of the flow determined to a reference characteristic value of the flow and, based on the comparison, determining:
- the specific heat capacity when the characteristic value determined is below the reference characteristic value; and
- the thermal conductivity when the characteristic value determined exceeds the reference characteristic value.

14. The method of claim 9, further comprising the step of comparing an expected value of the output signal of one of the Coriolis flow sensor and the thermal flow sensor to a measured value of said one of the Coriolis flow sensor and the thermal flow sensor, wherein the ratio of the expected value to the measured value is used for determining the specific heat capacity of the medium.

15. The method of claim 9, further comprising the step of identifying the medium in the flow measurement system based on determined values for at least one physical property selected from the group consisting of specific heat capacity, thermal conductivity, and density.

16. The method of claim 9, wherein the medium is a mixture comprising two known components, wherein the method comprises the step of determining the fraction of each of two known components based on determined values for at least one physical property selected from the group consisting of specific heat capacity, thermal conductivity, and density of the mixture.

* * * * *